United States Patent [19]

Collins

[11] 4,034,686
[45] July 12, 1977

[54] INJECTOR FOR SOIL TREATING LIQUIDS

[75] Inventor: William C. Collins, Miami, Fla.

[73] Assignee: Outboard Marine Corporation, Waukegan, Ill.

[21] Appl. No.: 634,758

[22] Filed: Nov. 24, 1975

Related U.S. Application Data

[63] Continuation-in-part of Ser. No. 346,023, March 29, 1973, Pat. No. 3,926,131.

[51] Int. Cl.² .................................... A01C 23/02
[52] U.S. Cl. .................................. 111/7; 111/89; 137/625.11; 172/22
[58] Field of Search .............. 111/6, 7, 89; 172/21, 172/22, 53, 93; 137/625.11, 625.15, 625.46; 239/97, 447

[56] References Cited

U.S. PATENT DOCUMENTS

| 1,871,529 | 8/1932  | Karshner       | 111/6        |
| 2,789,522 | 4/1957  | Barton         | 111/6        |
| 2,800,066 | 7/1957  | Cohrs et al.   | 172/22       |
| 2,812,753 | 11/1957 | Zobaty         | 137/625.11 X |
| 2,930,334 | 3/1960  | Marron et al.  | 111/6        |
| 3,107,638 | 10/1963 | Johnston       | 111/7.1      |
| 3,136,274 | 6/1964  | Townsend       | 111/6        |
| 3,288,432 | 11/1966 | Ferrin et al.  | 137/625.11 X |
| 3,289,418 | 12/1966 | Edgerton       | 111/7.3      |
| 3,409,033 | 11/1968 | Johnston       | 111/6 X      |
| 3,429,378 | 2/1969  | Mascaro        | 172/22       |
| 3,926,131 | 12/1975 | Collins        | 111/6        |

FOREIGN PATENT DOCUMENTS

| 1,052,149 | 3/1959 | Germany        | 111/7    |
| 463,470   | 5/1951 | Italy          | 111/7.4  |
| 732,750   | 6/1955 | United Kingdom | 111/7    |

Primary Examiner—Edgar S. Burr
Assistant Examiner—Steven A. Bratlie
Attorney, Agent, or Firm—Michael, Best & Friedrich

[57] ABSTRACT

As the applicator is propelled about the surface to be treated, hollow spikes called tines or tongs are alternately thrust, vertically downwards below the surface and withdrawn vertically upwards. A bulk supply of treating liquid is maintained separate from the applicator, so the applicator is more maneuverable and less bulky. The supply is pressurized and supplied to the applicator via a high pressure hose line. The drive for reciprocating the tongs also powers a flow-dividing valve, which supplies the treating liquid to each of the tongs in turn, so that each tong liquid injects only when that tong is under the ground surface.

4 Claims, 8 Drawing Figures

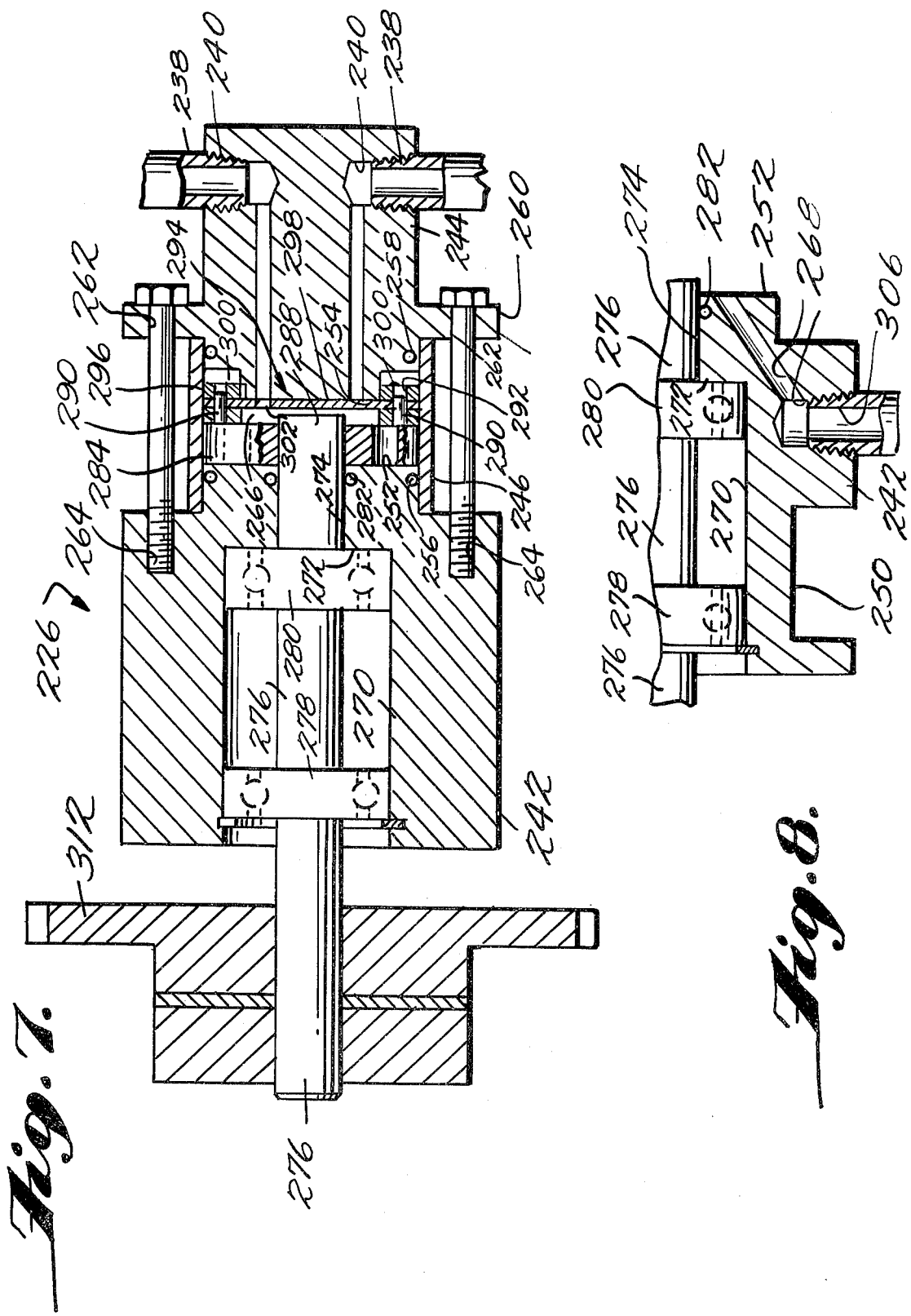

INJECTOR FOR SOIL TREATING LIQUIDS

REFERENCE TO RELATED APPLICATION

This is a continuation-in-part of my earlier, co-pending U.S. Pat. application, Ser. No. 346,023, filed Mar. 29, 1973, now U.S. Pat. No. 3,926,131, issued Dec. 16, 1975.

BACKGROUND OF THE INVENTION

Self-contained, hand-operated single point soil injectors have previously been available from Innis Speiden Chemical Company formerly of 117 Liberty Street, New York City, N.Y. and might presently be available from the Panagen Company, division of Morton Salt Company. Another example of such prior equipment is the Mack Anti-weed gun. Turf aerators are known in the prior art, an example being the Greensaire turf aerator available from the Ryan Equipment Company subsidiary of Outboard Marine Corporation. The device of the invention, in embodiments initially constructed, has been built as a modification of the Ryan WG24-1 Aerator.

U.S. Pat. No. 3,602,166 to Peterson of August 31, 1971, particularly in FIG. 12, illustrates a valve means for supplying fluid to a liquid injector comprising a vertically actuated rod and a perforated valve tip. The valving arrangement in this instance is operated by means of the turning drum having the injector needle on it as opposed to a separate ground engaging foot as in the present invention.

U.S. Pat. No. 3,136,274, Townsend, June 9, 1964 illustrates a somewhat different valving mechanism in FIG. 6, again operating off of the injector needle moving mechanism of the machine as opposed to a ground engaging foot. The drives as shown in this and the previous patent are perhaps of only general interest, as are drive mechanisms of patents U.S. Pat No. 2,056,337, Archibald of Oct. 6, 1936 and U.S. Pat. No. 2,255,040 Helbig of Sept. 9, 1941, these latter two patents being directed to lawn spikers having no injection means.

U.S. Pat. No. 3,025,806, Peck, Mar. 20, 1962 is directed to an injection nozzle arrangement having a valve which is operated by a ground engagement member. The entire unit is rotated as opposed to being vertically reciprocated.

The following patents show generally vertically reciprocated tubular tine means for injecting liquid plant or soil treating agents into the gound:

| U.S. Pat. No. | Patentee | Issue Date | |
|---|---|---|---|
| 1,871,529 | G. C. Karshner | August | 16, 1932 |
| 2,214,083 | M. Lester | September | 10, 1940 |
| 2,789,522 | J. R. Barton | April | 23, 1957 |
| 3,136,274 | W. M. Townsend | June | 9, 1964 |
| 3,148,643 | H. L. Mussett et al. | September | 15, 1964 |
| 3,450,073 | R. E. Baker | June | 17, 1969 |

The following patents were cited by the U.S. Patent Office in the above-mentioned parent application hereof:

| U.S. Pat. No. | Patentee | Issue Date | |
|---|---|---|---|
| 1,871,529 | G. C. Karshner | August | 16, 1932 |
| 2,056,337 | Archibald | October | 6, 1936 |
| 2,214,083 | Lester | September | 10, 1940 |
| 2,255,040 | Helbig | September | 9, 1941 |
| 2,789,522 | J. R. Barton | April | 23, 1957 |
| 3,025,806 | A. W. Peck | March | 20, 1962 |
| 3,136,274 | W. M. Townsend | June | 9, 1964 |
| 3,148,643 | Mussett et al. | September | 15, 1964 |
| 3,397,542 | Moulden | August | 20, 1968 |
| 3,450,073 | Baker | June | 17, 1969 |
| 3,602,166 | M. L. Peterson | August | 31, 1971 |
| 3,783,804 | E. A. Platz | April | 21, 1972 |
| 3,802,513 | Ploenges | April | 9, 1974 |

| Foreign - Swedish | | | |
|---|---|---|---|
| Patent No. | Patentee | Issue Date | |
| 309846 | C. Leuenberger | December | 1, 1955 |

SUMMARY OF THE INVENTION

The invention provides a device for loosening soil compaction, correcting soil pH, changing soil fertility, correcting adverse soil pest conditions (nematodes, diseases, weeds, insects) by supplying the plant roots with systemic insecticides, fungicides, nematacides or herbacides.

The device includes a wheeled, preferably self-propelled chassis, equipped with means for generally vertically reciprocating a plurality of shafts, preferably in staggered order. Each shaft has at least one downwardly projecting tine secured thereon which includes an outlet means near the lower tip thereof and interior passageway means communicating through a valve to a manifold for all the tines. The manifold is connected via a high pressure hose line to a separate, high pressure reservoir of liquid to be sprayed. Accordingly, liquid treatment material can be injected under high pressure, high volume conditions by an easily maneuverable applicator, since the operator need not lug around the reservoir.

Seen as an adaptation of the Ryan WG24-1 Turf Aerator, the adaptation involves removing the coring tines and related casting from the lower ends of the six vertically reciprocated shafts of the device and mounting the six dual tong injector units of the present modification. These are connected by individual high pressure lines to a manifold also mounted on the device as part of the adaptation thereof. The manifold is connected via a single high pressure hose e.g. to a tank trailer-type pressured liquid reservoir. Then the adapted unit is drawn along the ground or turf to be treated. Instead of pulling a plug of dirt and grass from the ground as the unmodified machine would have, the adapted machine injects a calibrated amount of liquid treating mixture into and below the surface of the ground with little damage to the surface. Typical pressurization for the injected liquid is 150–600 p.s.i., injections typically being on two inch centers to an adjustable depth exemplified by up to 4 inches, delivering an adjustable amount of from 1–50 gallons of treating liquid per 1000 square feet or turf area.

In reality, the machine of the invention may be built from scratch, but there are so many Ryan Turf Aerators in use that building from scratch is impractical and modification of existing equipment as described is much more expedient.

The device of the invention is preferred for use in administering toxic treating liquids since, by depositing them beneath the surface, the danger of lateral runoff to streams is minimized.

As the applicator is propelled about the surface to be treated, hollow spikes called tines or tongs are alternately thrust, vertically downwards below the surface and withdrawn vertically upwards. A bulk supply of treating liquid is maintained separate from the applicator, so the applicator is more maneuverable and less bulky. The supply is pressurized and supplied to the applicator via a high pressure hose line. The drive for reciprocating the tongs also powers a flow-dividing valve, which supplies the treating liquid to each of the tongs in turn, so that each tong injects liquid only when that tong is under the ground surface.

The principles of the invention will be further hereinafter discussed with reference to the drawings wherein a preferred emobodiment is shown. The specifies illustrated in the drawings are intended to exemplify, rather than limit, aspects of the invention as defined in the claims.

BRIEF DESCRIPTION OF THE DRAWINGS

FIG. 7 is a longitudinal cross-sectional view of the flow-dividing valve of FIG. 6; and FIG. 8 is a fragmentary longitudinal cross-sectional view thereof on another plane, to show the communication of the treating liquid inlet line with the valve chamber.

DETAILED DESCRIPTION OF THE ORIGINALLY PREFERRED EMBODIMENT

Figure 1:
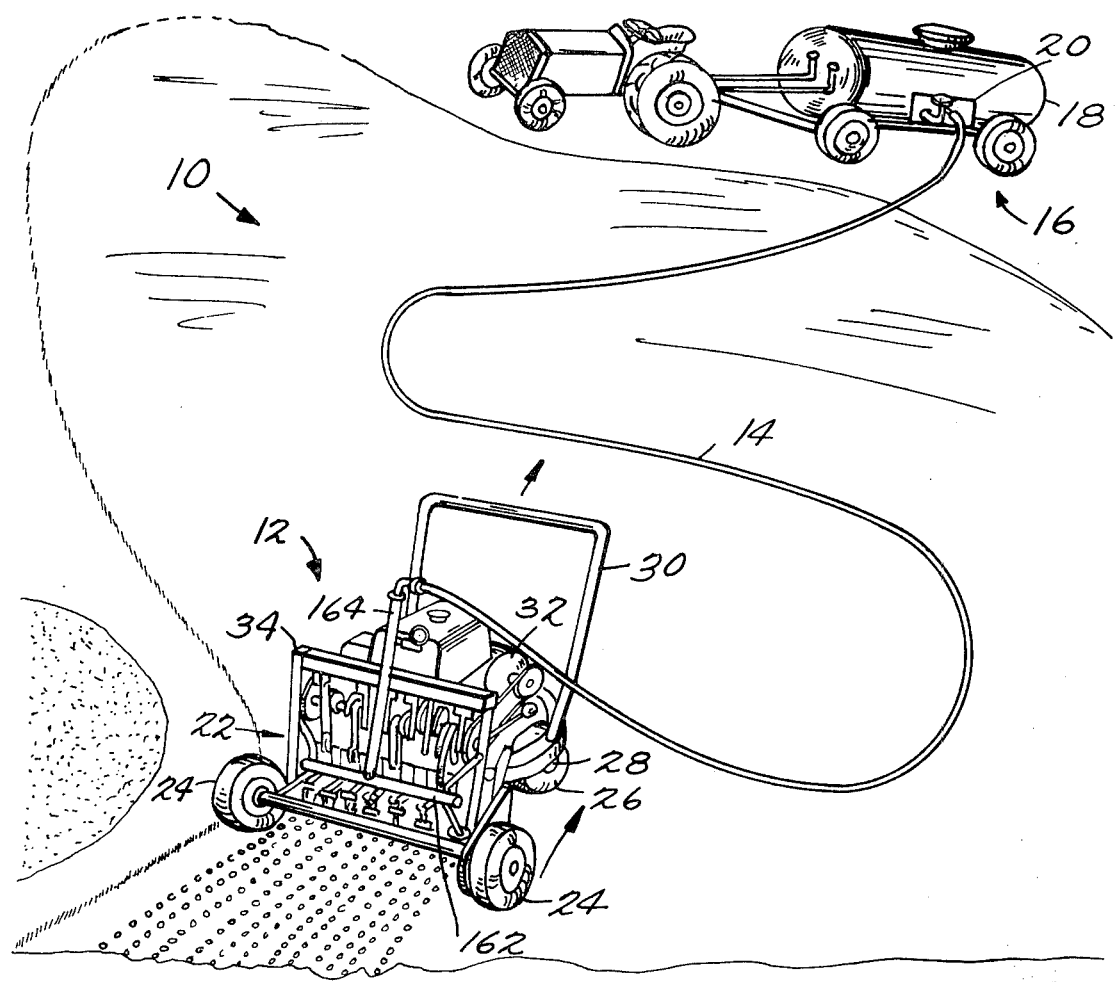
FIG. 1 is a perspective view of an original embodiment of the device in use.
Figure 2:
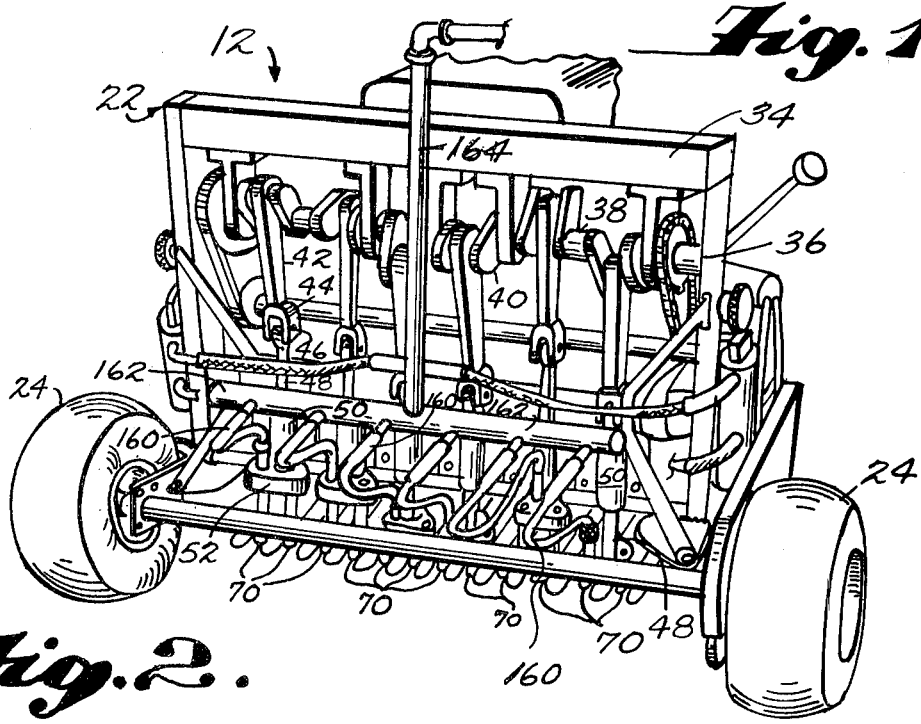
FIG. 2 is a perspective view of the injector unit of the device of FIG. 1 seen more from the rear and on a larger scale.

The pressurized liquid injector 10 includes an applicator unit 12 connected by a high pressure hose line 14 to a pressurized treating liquid supply 16.

In the instance depicted, the supply 16 takes the form of a tank wagon or the like 18 having a compressor 20 for placing the treating liquid under e.g. 150–600 p.s.i. The supply 16 may be e.g. from an agricultural orchard spraying unit, with the hose line 14 connecting to the applicator unit 12 rather than to a tree spraying wand.

The applicator unit 12 includes a frame 22 having right and left rear wheels 24 and a steering system comprising a two wheeled bogie or truck 26 journalled with respect to the frame 22 at 28 and having a forwardly projecting steering bar or tiller 30. A gasoline engine 32 is shown mounted on the frame and equipped for driving the wheels 24.

The frame further includes an inverted yoke 34 which at 36 mounts a crank shaft 38 having e.g. six angularly disparate, axially spaced offset cranking portions 40.

(Conventional drive interruption, clutch means are provided for disengaging the engine 32 from either the wheels 24 or the crank shaft 38). Each cranking portion 40 has a crank arm 42 journalled thereon which terminates in a clevis 44 which is in turn pivotally pinned at 46 to the upper end of a push rod 48 slidably mounted in a sleeve bearing 50 fixed on the frame 22.

Each push rod 48 has a dual tong injector unit 52 mounted thereon below the respective sleeve bearing 50.

Figure 3:
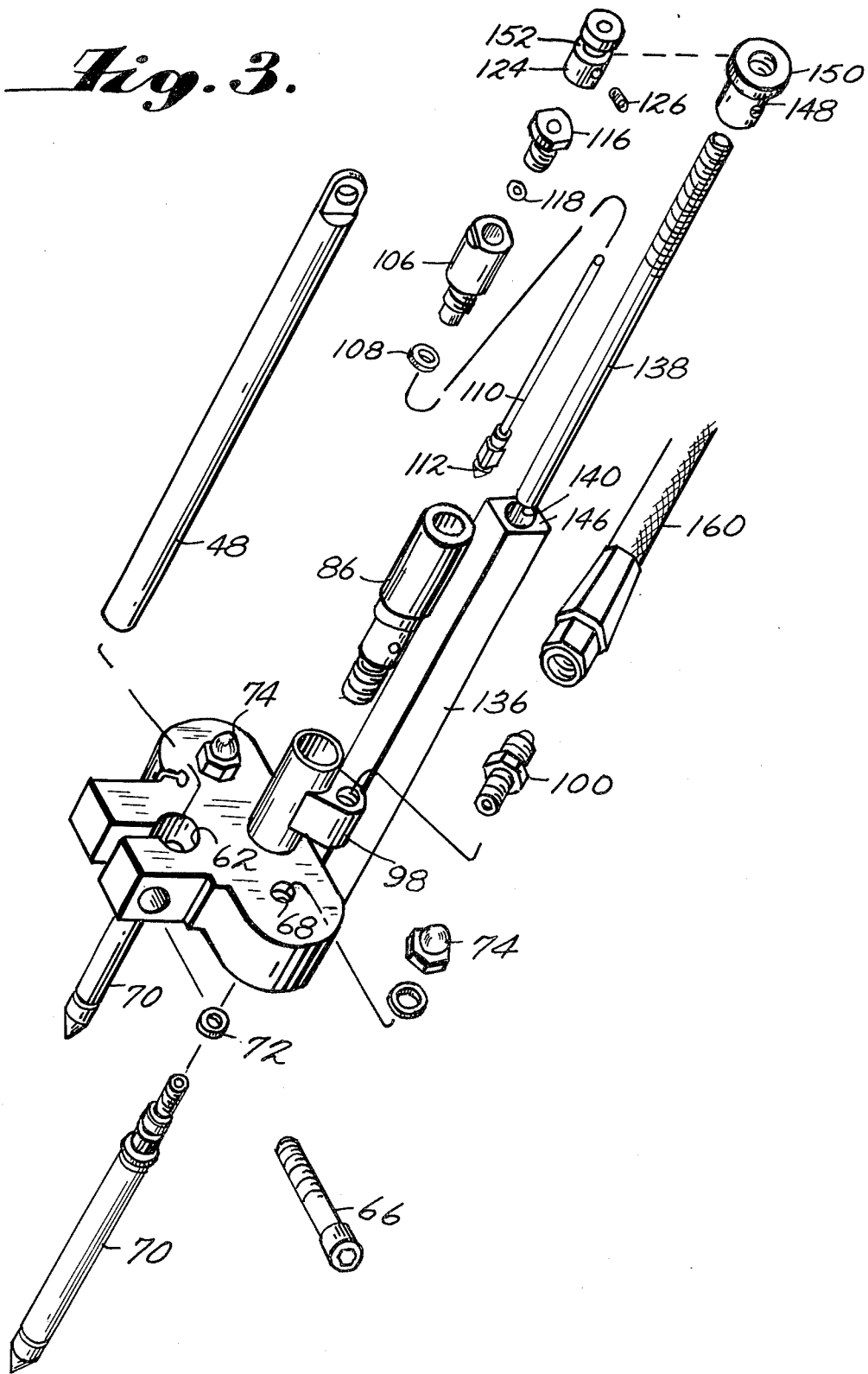
FIG. 3 is an exploded perspective of one dual tong injector of this embodiment.

In the instance depicted (see especially FIGS. 3 and 4) each dual tong injector unit 52 includes a body 54 which may be cast, although an example fabricated by welding from plate and tube is illustrated. The body 54 comprises a base plate 56 having a lateral projection 58 split at 60 leading to a vertical opening 62. A threaded lateral opening 64 crosses the split 60 and receives a cap screw 66 for narrowing the split 60 to construct the opening 62 for securing the body 54 on the respective push rod 48. Two laterally spaced vertical openings 68 receive the upper ends of two respective tubular injector tongs 70. The latter are sealed with respect to the respective openings 68 by sealing ring means 72 and secured in place by nuts 74.

Within the body 54, passageways 75 communicate the two tongs with a valve housing 76 incorporated into the body 54.

As depicted, the valve housing 76 is an upright, composite tubular member 78 having its throughbore 80 in communication with the passageway 75 at the lower end of the throughbore 80.

The lower most portion 82 of the housing 76 is internally threaded at 84 to receive the exteriorly threaded lower end of an intermediate tubular portion 86. An internal seal is made between these two parts at 88 and an external seal is made between them at 90. Intermediate these seals 88, 90, the parts 82 and 86 are radially spaced from one another circumferentially to define an annular chamber 92 the throughbore 80 flares upwardly to provide a frustoconical valve seat 94. Above the valve seat 94 radial bores interconnect the throughbore 80 with the chamber 92. A conduit 98 connects the chamber 92 with a hose fitting 100.

The valve housing intermediate portion upwardly terminates in an internally threaded portion 102 which receives the externally threaded lower end 104 of an upper portion 106. A seal is formed between these parts at 108.

A valve body 110 is reciprocatingly received in the throughbore 80 above the valve seat 94. It includes a conical tip 112 preferably made of resilient material such as nylon for sealing against the valve seat 94 when the valve is closed. The body 110 has a metal rod 114 as a stem. This rod 114 projects up the throughbore 80 and out the upper end thereof through an annular gland nut 116 which seals with the rod at 118.

A compression coil spring 120 encircling the rod 114 within the bore 80 gains purchase between the enlarged head 122 of the valve body and the lower end of the valve housing upper portion 106 to normally bias the valve toward a closed condition.

Outside the housing, a valve stem pusher 124 is mounted on the stem 114 with securement means 126. Accordingly, upward force on the pusher 124 raises the valve body away from the valve seat against the restoration force of the spring 120 permitting liquid supplied under pressure via the hose fitting 100 to flow through the conduit 98, into the chamber 92, through the radial bores into the throughbore 80, down between the valve body tip 112 and seat 94, into the passageways 75, into the two tongs through radial passageways 128, down the throughbores 130 of the two respective tongs and out the radiating openings 132 provided just above the solid, pointed lower tips 134 of the two respective tongs.

Each dual tong injector unit body 54 further includes a tubular, generally vertical, valve actuator mounting sleeve 136 disposed adjacent the valve housing. The sleeve 136 acts as a sleeve bearing for an actuator rod 138 which has a lower end 140 protruding below the lower end of the sleeve 136 for engagement with the surface of the ground. The region 144 near the upper end of the rod 138 is externally threaded and protrudes above the upper end 146 of the sleeve 136 and threadably mounts an internally threaded flange member 148. The latter has a flange portion 150 which protrudes laterally into the external lateral groove 152 of the valve stem pusher 124, connecting the valve stem to the actuator so that when the actuator is pushed up by contact of the lower end 142 with the ground, the valve is opened until further rotation of the crank shaft 38 raises the dual tong injector unit under consideration sufficiently to permit the actuator rod 138 to begin to lower. It should be apparent that rotative adjustment of the flange member 148 relative to the rod 138, by threading, vertically adjusts the deposition of the lower end of the rod 138 with respect to the rest of the particular dual tong injector unit and the surface of the ground, thus providing a means for increasing and decreasing the proportion of the vertical indexing cycle for the respective dual tong injector unit during which the associated valve is open and the two associated tongs injecting. The earlier and later a valve is open the more liquid will be injected and the thicker the band of injection will be reaching the same depth but extending up closer to the surface of the ground, other factors being equal.

When being used, for instance to treat the turf of a golf course green, the tank wagon 18 is drawn to its border and its contained treating liquid delivered under high pressure by the pump 20 through the hose line 14 to the application unit 12. That unit is led over the surface of green, much like a power mower. As the dual tong units 52 are indexed up and down by the crank shaft 38, the respective actuator rods 138 strike the ground during the downstrokes opening the respective valves 110 while the respective injector tips are below the upper surface of the turf.

Each hose fitting 100 connects a flexible hose 160 with a manifold 162 mounted on the frame 22. The manifold 162 has an inlet pipe 164 which connects at its upper end with the high pressure hose 14 to receive a supply of treating liquid from the compressor 20 on the tank wagon 18.

Being able to treat with injections at relatively high pressure, while separating the bulk supply and pressurization bulk and weight to a relatively stationary place (the tank wagon) so that it does not have to be lugged around with the applicator unit makes the latter much more mobile and versatile.

There are instances where it is disadvantageous to operate the valves 110 from push rod engagement with the ground at 140. In such instances, suitable camming means may be provided which work from the cam shaft 38 to cause the actuators 124 to relatively lift with respect to the valve housing 76 when the respective bodies 56 are moved downward because of their securement on the respective vertically reciprocated rods 48.

In fact, as described below, an embodiment of the latter sort, which eliminates the need for a plurality of valves 110 and ground engaging feet has come to be preferred.

DESCRIPTION OF THE PRESENTLY PREFERRED EMBODIMENT

Referring now to FIGS. 5–8, a second embodiment is shown, to illustrate use of the tong raising and lowering means to power a flow-dividing valve. This valve receives the supply of pressurized treating liquid and successively supplies it in a repeating pattern to each of a plurality of supply lines leading to the respective sets of tines. According to the pattern, only a set of tines which is at the moment plunged into the ground receives the pressurized supply of treating liquid. Thus this embodiment eliminates a need for valves on each set of tines, and ground engaging feet.

As with the first-described embodiment, the second is most expeditiously provided by modifying an existing, commercially available machine, for instance a Ryan Greensaire turf aerator, model WG24-1. The latter machine includes a frame 210 on which is mounted a 4-cycle gasoline engine 212. Ground engaging wheels 214 are provided to be driven by the engine through suitable clutch and transmission means to propel the machine about the surface being treated, for instance a golf course green. A transversally extending row of generally vertically oriented bearings 216 is provided on the frame. Each bearing 216 slidingly receives a rod 218. A crank shaft 220 extends transversally between additional bearings on the frame. Its crank portions are pivotally connected to respective ones of the rods 218 by connecting rods 222. The engine rotates the crankshaft 220 through suitable clutch and transmission means which are shown including an endless drive chain 224.

Before modification, the turf aerator has pairs of replaceable, downwardly directed hollow tines mounted on the lower ends of the rods 218. Thus, as the turf aerator is propelled over the surface undergoing treatment, the pairs of tines are successively plunged into the turf and then withdrawn, each tine removing a soil and thatch core from the turf. This particular model turf aerator puts 36 holes each three inches deep in each square foot of turf. The cores are typically from one fourth inch diameter to five eighths inch diameter, depending on the size of hollow tines being used.

In modifying the turf aerator, the hollow tines are removed and a soil treating liquid injector kit is mounted on the machine.

The soil treating injector kit includes a rotary, flow-dividing valve 226, an inlet conduit 228, a plurality of outlet conduits 230 and a corresponding plurality of dual tong soil treating liquid injectors 232. (In the embodiment shown, there are six.)

Figure 4:
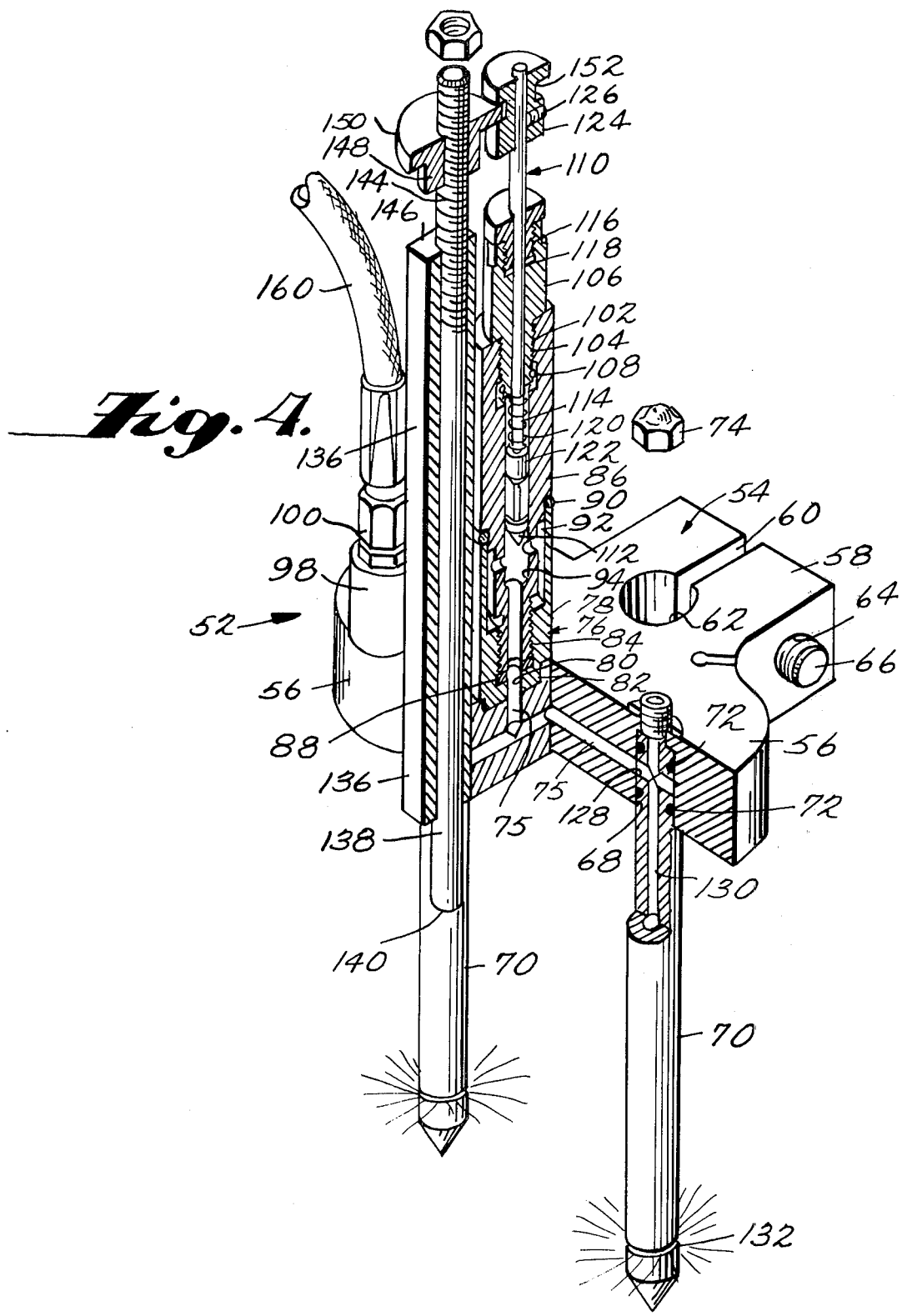
FIG. 4 is a partly cut-away perspective view of one dual tong injector of this embodiment, shown with the valve thereof reciprocated to a valve-open condition.
Figure 5:
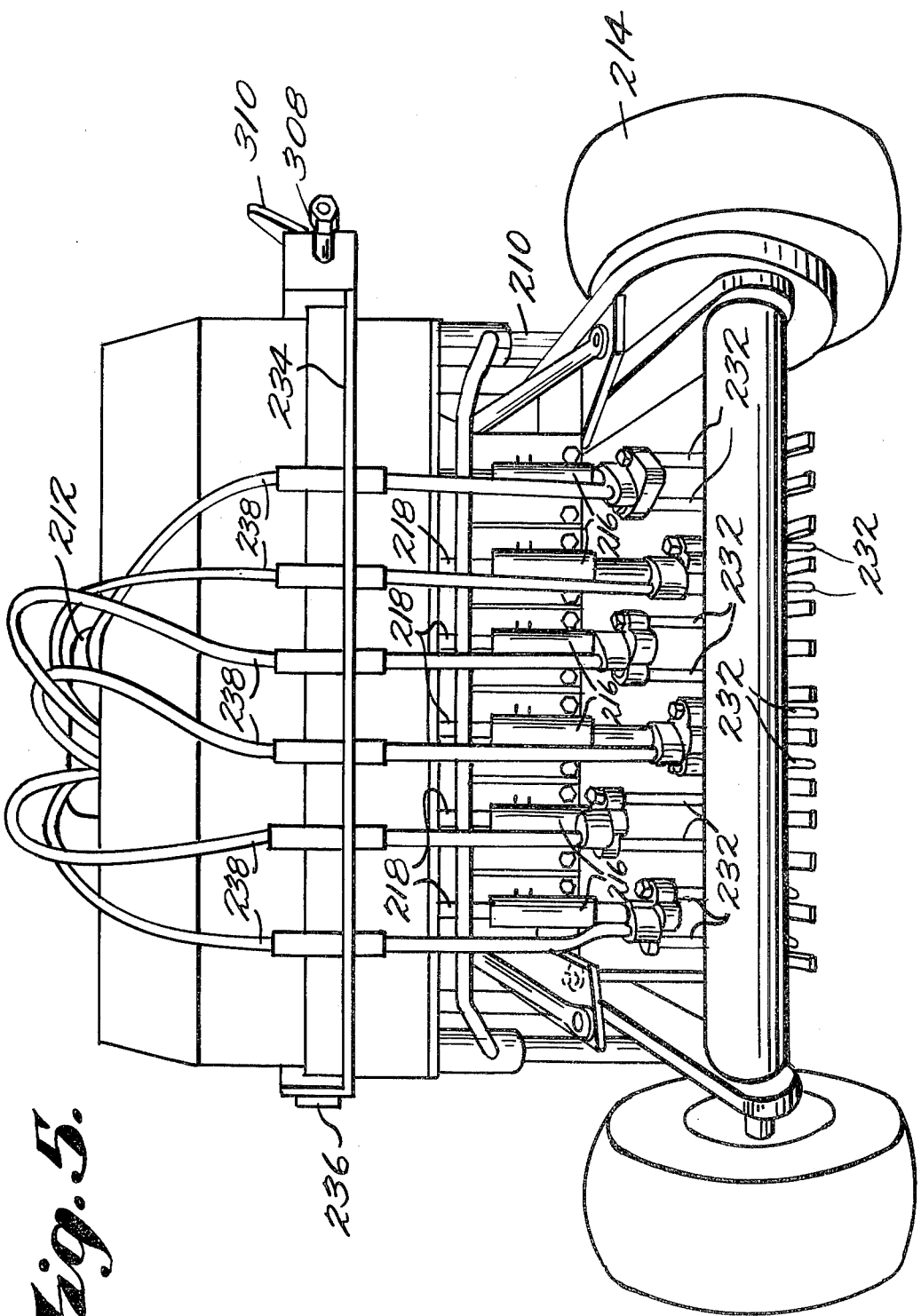
FIG. 5 is a perspective view from the rear of a second, now more preferred embodiment of the applicator, with a schematic showing its connection to the separate supply of treating liquid.
Figure 6:
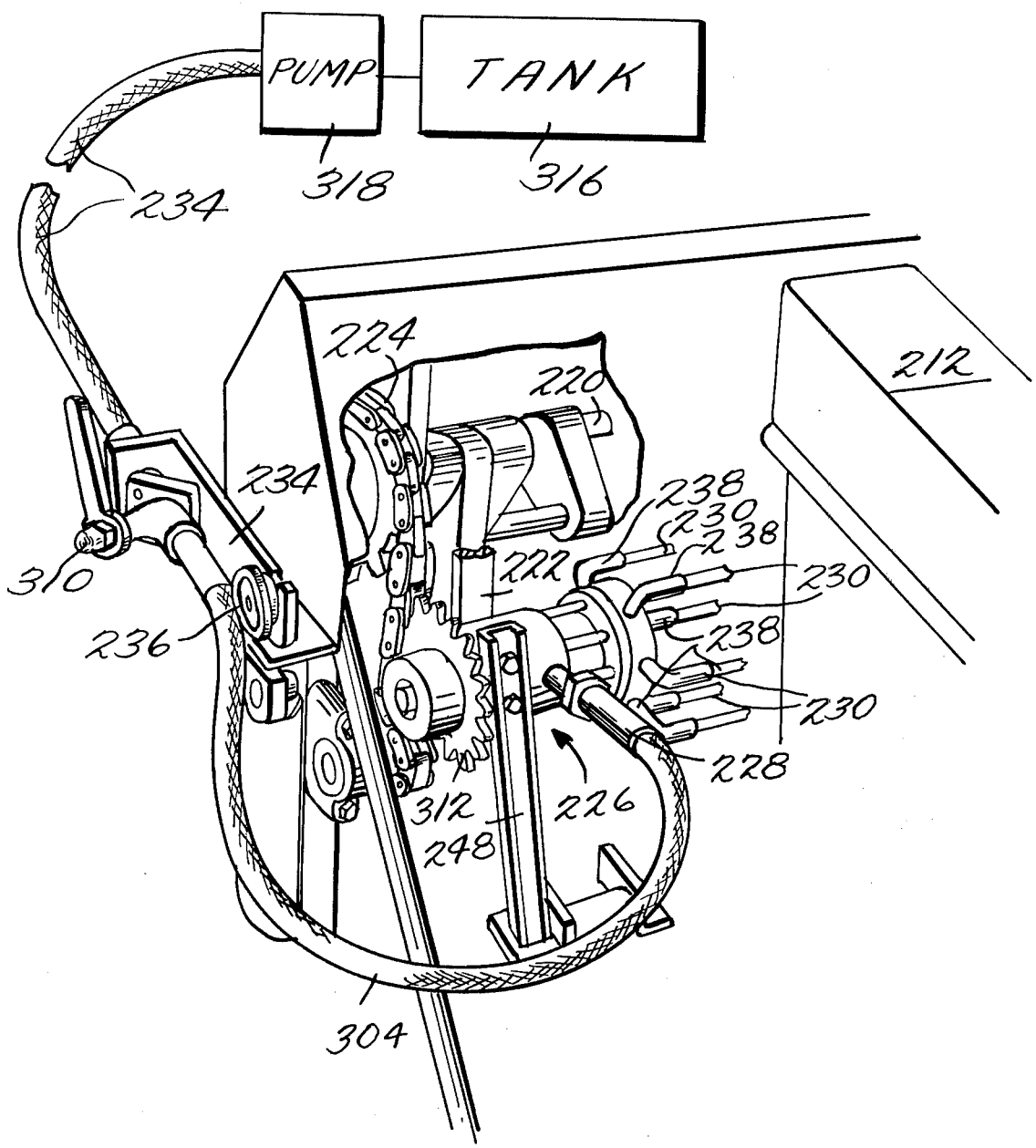
FIG. 6 is a fragmentary perspective view of the FIG. 5 emobodiment from the front, showing the flow-dividing valve and its connections to liquid inlet and outlet lines.

The injectors 232 are substantially as shown in FIG. 4, excepting that in the embodiment of FIGS. 5–8 foot 138 and the valve body 110 are eliminated and a cap is installed at 84 so that there is an open communication between each respective outlet conduit 230 and the tong openings 132.

The outlet conduits 230 each pass through and are secured to a mounting bar 234 which is, in turn, mounted at 236 on the frame 210. At their upstream ends, the six outlet conduits 230 terminate in respective fittings 238 which connect them, respectively, to six outlet ports 240 on the flow-dividing valve 226.

The flow-dividing valve 226, in the example shown, has a three-part housing which includes an inlet portion 242, an outlet portion 244 and a tubular spacer 246. A bracket 248 secures between the housing inlet portion 242 at 250 and the frame 210 to mount the flow-dividing valve on the frame.

Cylindrical bosses 252, 254 on the inlet and outlet portions 242, 244 of the valve housing snugly fit in the opposite ends of the tubular spacer 246 and O-rings provide respective seals at 256, 258.

A radiating flange 260 on the outlet portion 244 of the housing is provided with a circle of bolt holes 262 in axial alignment with a corresponding plurality of threaded sockets 264 in the axially inner end of the inlet portion 242 of the housing. Respective bolts are inserted through the holes 262 and threaded tightly in the sockets 264 to hold the housing together.

Thus, the space within the tubular spacer 246, axially between the bosses 252, 254 provides a valve chamber 266. An inlet port 268 proceeds through the inlet portion 242 of the housing to communicate through the boss 252 with the chamber 266. The six outlet ports 240 proceed through the outlet portion 244 of the housing to communicate through the boss 254 with the chamber 266. Adjacent their juncture with the outside of the housing, all of the ports 240, 268 are internally threaded to facilitate the respective conduit connections therewith.

Coaxially with the chamber 266, the outer end of the housing inlet portion is provided with a cylindrical recess 270. At its axially inner end wall or shoulder 272, the recess 270 has a smaller diameter throughbore 274 which communicates with the chamber 266.

A stub shaft 276 extends through the throughbore 274 and a short way into the chamber 266. The shaft 276 also extends a substantial way out of the housing inlet portion through the mouth of the recess 270. Bearing sets 278, 280 received in the recess 270 journal the shaft 276 for rotation. An O-ring seal 282 between shaft 276 and the throughbore 274 maintains the sealed integrity of the valve chamber 266.

Within the valve chamber 266, an annular drive yoke 284 is secured by Roll Pin means on the axial short portion 288 of the shaft 276. The drive yoke 284 includes a pair of diametrically spaced, axially projecting drive pins 290 which extend toward the boss 254.

The pins 290 are slidingly received through corresponding openings 292 in the outer rim of a valve body 294. In the instance shown, the valve body 294 is constituted by a pair of rigid rings 296 applied against opposite faces of a sheet 298 of lubricous plastic material, such as polytetrafluoroethylene. This assembly is held together with a plurality of rivets 300. The sheet 298 has a single eccentric opening 302 at the same radial distance as that of the communication of the six outlet ports 240 with the chamber 266.

Thus, as the shaft 276 is rotated, the drive yoke 284 correspondingly rotates the valve body 294 causing the eccentric opening 302 to successively momentarily align with each of the six outlet ports 240. Pressurized soil treating liquid which flows into the valve chamber 266 through the inlet port 268 passes through the eccentric opening 302 and issues out of each of the several outlet ports 240 in turn.

An inlet conduit 304 extends between a fitting 306 connecting it to the inlet port 268 and a fitting 308 secured on the mounting bar 234. A control valve 310 is shown incorporated in the inlet conduit 304 adjacent the fitting 308. Both the inlet conduit 304 and the outlet conduits 230 are shown constituted by flexible, high pressure hose lines.

Outside the housing of the flow-dividing valve 226, a drive sprocket 312 is secured on the shaft 276. The teeth of the sprocket 312 are meshed in the roller chain 224, so that when the applicator is being propelled upon a surface being treated, and the tong raising and lowering crank shaft is being rotated, the running roller chain 224 rotates the sprocket 312 and thus operates the valve 226. In consequence, high pressure liquid treating fluid supplied to the inlet conduit 304 at the fitting 308 is divided in the valve 226 and sent in sequential segments out the six outlet conduits 230. The outlet conduits 230 are respectively communicated to the throughbores of the tong pairs and thus to the nozzles 132 at the respective tong tips.

In use, the fitting 308 of the applicator of the second embodiment is connected by a high pressure hose line 314 to a separate, treating liquid supply, for instance a tank wagon 316 having an on-board compressor 318 for pumping liquid through the line 314 under the same pressure as in the FIG. 1 embodiment.

While the second embodiment has been described as modification of a particular design of existing machine, it should be clearly apparent that it can be put into practice by modifying other existing designs of machine, or built from the ground, up.

It should now be apparent that the injector for soil treating liquids as described hereinabove, possesses each of the attributes set forth in the specification under the heading "Summary of the Invention" hereinbefore. Because the injector for soil treating liquids can be modified to some extent without departing from the principles of the invention as they have been outlined and explained in this specification, the present invention should be understood as encompassing all such modifications as are within the spirit and scope of the following claims.

What is claimed is:

1. An injector for soil treating liquids comprising a frame, a source of rotary power supported by said frame, means for supporting said frame from the ground surface for permitting said frame to be drawn along the ground surface, a plurality of injection tines each having a downwardly directed tip, means mounting each injection tine on said frame in a generally vertical orientation and for cyclic reciprocation between an upper extreme wherein said tip is raised clear of the ground surface and a lower extreme wherein said tip has plunged beneath the ground surface, said mounting means including a crankshaft journalled for rotation on said frame and having a plurality of offset crank portions, an endless drive member driven by said source of rotary power and connected to said crankshaft so as to rotate said crankshaft by said source of rotary power, rotary-to-reciprocating drive means connecting respective crank portions to respective tines so that as said crankshaft is rotated said tines are reciprocated, means defining a nozzle adjacent each of said tips for dispensing treating liquid into the soil when said tips lie beneath the ground surface, means defining a passageway for treating liquid through each of said tines to said nozzle thereof, a flow-dividing valve mounted on said frame and including a housing having therein means defining a valve chamber, an inlet means communicating with said valve chamber, a plurality of outlet means communicating with said valve chamber, and a valve body received in said valve chamber, rotatable relative to said chamber, and including means defining a port having one end in communication with said valve inlet means and having another end which, as said valve body is rotated, is sequentially brought into and then out of communication with each of said valve outlet means, a plurality of conduit means connecting each of said valve outlet means to said passageway of at least one, but less than all, of said tines, a valve drive shaft secured to the valve body and extending out of said valve housing, and a rotary drive member mounted on said valve drive shaft and in driving engagement with said endless drive member so as to rotate said valve body and said crankshaft in timed relation, to thereby supply treating liquid through each passageway to each of said nozzles for injection into the ground only when said tips of said tines are beneath the ground surface.

2. The injector of claim 1 wherein said tines are mounted in pairs for joint reciprocation, and wherein each of said conduits connects between a respective valve outlet means and the passageways of both tines of a respective pair of tines.

3. An injector for soil treating liquids comprising a frame, a source of rotary power supported by said frame, means for supporting said frame from the ground surface for permitting said frame to be drawn along the ground surface, a plurality of injection tines generally arranged in a transversely extending row, each injection tine being generally vertically disposed and having a downwardly directed tip, means mounting each injection tine on said frame for cyclic reciprocation between an upper extreme wherein said tip is raised clear of the ground surface and a lower extreme wherein said tip has plunged beneath the ground surface, said mounting means including a crankshaft journalled for rotation on said frame and having a plurality of offset crank portions, rotary-to-reciprocating drive means connecting respective crank portions to respective tines so that as said crankshaft is rotated said tines are reciprocated, a drive chain driven by said source of rotary power and connected to said crankshaft so as to rotate said crankshaft by said source of rotary power, means defining a nozzle adjacent each of said tips for dispensing treating liquid into the soil when said tips lie beneath the ground surface, means defining a passageway for treating liquid through each of said tines to said nozzle thereof, a flow-dividing valve mounted on said frame and including a housing having therein means defining a valve chamber having a substantially circular transverse cross section, an inlet means communicating with said valve chamber, a plurality of outlet means communicating with said valve chamber, and a valve body having a substantially circular transverse cross section, received in said valve chamber between where said valve inlet means and said valve outlet means communicate with with said valve chamber, said valve body being rotatable relative to said chamber and including means defining a port having one end in communication with said valve inlet means and having another end which, as said valve body is rotated, is briefly and sequentially brought into and then out of communication with each of said valve outlet means, a plurality of conduit means connecting each of said valve outlet means respectively to said passageway of at least one, but less than all, of said tines, a valve drive shaft secured to the valve body and extending out of said valve housing, and a sprocket mounted on said valve drive shaft and meshed with said drive chain so as to rotate said valve body and said crankshaft in timed relation, to thereby supply treating liquid through each passageway to each of said nozzles for injection into the ground only when said tips of said tines are beneath the ground surface.

4. The injector of claim 3 wherein said tines are mounted in pairs for joint reciprocation, and wherein each of said conduits connects between a respective valve outlet means and the passageways of both tines of a respective pair of tines.

* * * * *